(12) United States Patent
Gauthier et al.

(10) Patent No.: US 6,604,549 B2
(45) Date of Patent: Aug. 12, 2003

(54) DEVICE FOR FIXING A TUBULAR ELEMENT IN AN INACCESSIBLE CAVITY

(75) Inventors: Philippe Gauthier, Muret (FR);
Bernard Wurier, Valmondois (FR);
Peter Friedrich Herrmann, Triel sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/253,798

(22) Filed: Sep. 25, 2002

(65) Prior Publication Data

US 2003/0056844 A1 Mar. 27, 2003

(30) Foreign Application Priority Data

Sep. 27, 2001 (FR) ............................................ 01 12451

(51) Int. Cl.[7] ................................................ F16L 55/10
(52) U.S. Cl. .......................... 138/108; 138/113; 138/103
(58) Field of Search ............................... 138/108, 103, 138/110, 113, 114; 248/49

(56) References Cited

U.S. PATENT DOCUMENTS

| 3,814,835 | A | * | 6/1974 | Merry .................... 174/70 R |
| 3,948,291 | A | * | 4/1976 | Persson ................... 138/103 |
| 4,440,154 | A | * | 4/1984 | Bellows ................... 126/694 |
| 4,806,705 | A | * | 2/1989 | Chen ..................... 174/135 |
| 5,082,027 | A | * | 1/1992 | Stanley ................... 138/113 |
| 5,305,797 | A | * | 4/1994 | Roy, Sr. .................. 138/108 |

FOREIGN PATENT DOCUMENTS

| DE | 197 44 006 A1 | 4/1999 |
| GB | 2 124 728 A | 2/1984 |

OTHER PUBLICATIONS

Patent Abstracts of Japan, vol. 2000, No. 07, Sep. 29, 2000 & JP 2000 104325 A (Takiron Co. Ltd), Apr. 11, 2000.
Patent Abstracts of Japan, vol. 1999, No. 11, Sep. 30, 1999 & JP 11 150822 A (Yoshimura Kensetsu Kogyo KK) Jun. 2, 1999.
Patent Abstracts of Japan, vol. 018, No. 051 (M–1548), Jan. 26, 1994 & JP 05 272664 A (Nippon Steel Weld Prod & Eng. Co. Ltd; Others: 01), Oct. 19, 1993.
Patent Abstracts of Japan, vol. 1998, No. 09, Jul. 31, 1998 & JP 10 110465 A (Sekisui Chem. Co Ltd.) Apr. 28, 1998.

* cited by examiner

Primary Examiner—Patrick Brinson
(74) Attorney, Agent, or Firm—Sughrue Mion, PLLC

(57) ABSTRACT

The present invention relates to a device for fixing a tubular element in a cavity, which device is made up of hoops made of an elastically flexible material disposed in cross-sectional planes of said cavity, and means for retaining said element, said device being characterized in that, along the longitudinal axis of said cavity, said hoops are secured together by a flexible longitudinal support and are interconnected by a flexible membrane.

13 Claims, 5 Drawing Sheets

DEVICE FOR FIXING A TUBULAR ELEMENT IN AN INACCESSIBLE CAVITY

The present invention relates to a device for fixing a tubular element that is to be installed in cavities that are inaccessible to an operator, in particular tubular cavities such as a network of pipes, ducts, or conduits in particular for collecting sewerage or rainwater. In such tubular cavities, the inaccessibility results in particular from their flow cross-section being too small. The invention also relates to a method of putting the device into place, in particular in small-diameter tubular cavities in which visual and physical direct access is impossible, and in particular in cavities of less than 200 millimeters (mm) in diameter.

BACKGROUND OF THE INVENTION

The tubular element may be a cable, such as, for example, an optical fiber cable used for telecommunications, or else a conduit, in particular a hollow tube serving to receive one or more cables. Commonly, the tubular element is fixed to the inside wall of an inaccessible cavity by individualized fixing means disposed uniformly along the cavity. Such fixing means are fixed in advance to the inside wall of the cavity, usually to the top portion, by a remote-controlled device. A problem that arises is how to guarantee secure and lasting fixing of the means to the wall of the cavity, whose component material can be of various types.

Patent Document DE-198 13 728 provides resilient open rings which are put in place one-by-one in the cavity in a contracted form, and are then released once the ring is positioned facing a groove that is already provided in the wall of the cavity. In the absence of a groove, the ring must also expand axially in order to remain in place. At its top portion, each of those rings is provided with a recess for receiving the tubular element. The fixing elements are inserted by means of a remote-controlled robot.

Methods that use individualized fixing means suffer from the drawback of requiring a robot to be used to fit the fixing means one by one, which constitutes an operation that is lengthy, difficult, and therefore costly. In addition, those fixing means constitute pieces in relief on the wall; such relief can retain solid residue flowing in the conduit, and hinder subsequent cleaning operations. To mitigate those drawbacks, a solution has been provided by the use of a lining covering all of the inside wall of the cavity, the tubular element being held in place between the wall and the lining. That solution makes it possible to hold the tubular element with a smaller amount of relief and regardless of the material of which the wall of the cavity is made.

Document GB-2 124 728 describes installing a television cable in an existing sewer whose inside wall may optionally be modified to receive the cable. Preferably, the cable is suspended from the ceiling of the cavity. To retain the cable, that document proposes to use an adhesive plastics material that is spirally wound along the cavity, the cable being sandwiched between the inside wall of the cavity and that lining material.

Document JP-1 039 208 proposes holding a cable in place by means of a lining of an absorbant flexible material. While in the form of a pouch, that lining is inserted into the cavity by means of a fluid under pressure. A setting resin is sprayed onto the lining as it is being inserted. Document JP-2 131 312 describes a porous lining that adheres to the wall by means of an adhesive epoxy resin sprayed onto the inside of it. Those methods are particularly complex and costly because of the amount of the external infrastructure that is required for spraying resin.

All those methods using a lining are costly because the entire surface of the cavity is lined. In addition, the adhesion between the lining and the wall deteriorates over time. The consequences are that the cable is no longer held properly and that portions of lining can come away, in particular from the top portion of the cavity under gravity, thereby obstructing the cavity at least in part.

OBJECTS AND SUMMARY OF THE INVENTION

An object of the present invention is to overcome the drawbacks of the prior art by providing a fixing device for fixing a tubular element into a cavity that is inaccessible to an operator, which device is quick and simple to install, and therefore inexpensive to install. In particular, the invention provides a device which can be installed without requiring the use of a robot or of major external infrastructure.

The present invention provides a device for fixing at least one tubular element in a cavity, which device is made up of hoops made of an elastically flexible material disposed in cross-sectional planes of said cavity, and means for retaining said element, said device being characterized in that, along the longitudinal axis of said cavity, said hoops are secured together by a flexible longitudinal support and are interconnected by a flexible membrane.

The hoops are in the form of rings that are open in part and that are made of a material that is elastically flexible and resilient. They are disposed in cross-sectional planes of the cavity at regular intervals along the longitudinal axis of the cavity. Their function is to hold the tubular element against the wall of the cavity, advantageously at the highest point. Preferably, said hoops are made of a material selected from a metal, in particular steel, a plastics material, glass fibers, carbon fibers, an elastomer, and a composite material.

The membrane interconnecting the hoops along the longitudinal axis of the cavity is made of a material that is flexible and strong such as an elastomer, e.g. a polyurethane or a silicone, in order to adapt to match the irregularities of the cavity, such as a change of direction. Advantageously, the membrane is subjected to tension when the device is made so as to avoid any risk of subsequent creep of the material. The presence of the membrane secures the hoops together and makes it unnecessary to use a tool for installing the device in the cavity.

In a preferred embodiment, said membrane covers said hoops. Thus, the hoops are protected from attack from the surroundings, and in particular from corrosion. For example, the device may be manufactured by extrusion, casting, molding, or assembling together two thicknesses of membrane on either side of the hoops.

The longitudinal support is used to impart a certain amount of stiffness to the device so as to maintain fixed spacing between the hoops throughout the entire time during which the device is being installed in the cavity. The support must however be capable of bending so as to adapt to match the configuration of the cavity, in particular the relief or changes of direction. The longitudinal support may be the tubular element itself, or else a semi-rigid strength member. The support is incorporated into the membrane while the device is being manufactured.

Each hoop is provided with means for retaining the tubular element. For example, said means may be made by deforming a portion of the hoop so as to form a cradle-forming recess for receiving the tubular element. In which case, the tubular element may itself constitute the longitudinal support by being fixed or welded to the hoop. The retaining means may also consist of a separate holding part mounted on the hoop and serving to receive the tubular element.

The tubular element may be a cable, and in particular an optical fiber cable used for telecommunications, or else a hollow tube serving to receive one or more cables. In which case, the tube may be smooth or corrugated. A corrugated tube offers the advantage of being more flexible than a smooth tube, and of avoiding its wall being kinked into the inside of the tube during bending. The tube is made of a material selected from metal, in particular steel, a plastics material, glass fibers, carbon fibers, an elastomer, and a composite material.

The present invention offers the advantage that this device can be used in all types of cavity, in particular a cavity that is inaccessible to an operator, and even a cavity of very small diameter, provided that the device does not obstruct the cavity, because it is not necessary to insert an instrument into the cavity in order to put the device in place. The device of the invention is therefore easier and less costly to install.

The device may be used in all types of cavity, regardless of their diameters and regardless of the materials of which the walls are made (cement, PVC, cast iron, etc., . . . ), even when various different diameters or a plurality of materials are encountered successively along the same duct. In addition, it is not necessary to position it over the entire length of a tubular cavity, but rather it is necessary merely to equip the linear portions of said cavity with said device. Once the device has been installed, a surface that is very clean and smooth is available in advantageous manner over the angular portion of the wall corresponding to the length of the deployed hoop.

The invention also provides a method of fixing a tubular element by means of the above-described device, the method comprising the following steps:

the topography of the inside wall of said cavity is surveyed by using a remote-controlled instrument;

said device is adapted to match the topography of said cavity;

said device is inserted into said cavity, said hoops being in a contracted form; and the hoops are released and they bear against said wall by taking up a deployed form.

Prior to installing the device, the cavity must be cleaned. The cleaning instrument is, for example a remotely-controlled instrument having means for displacing it linearly by propulsion, and means enabling it to be angularly positioned in three dimensions. The propulsion and angular positioning means use pressurized fluid jets and are controlled hydraulically or pneumatically. The remote-controlled instrument used for the cleaning may advantageously also serve to record the topography of the cavity, e.g. by being equipped with a camera, the cavity being illuminated by means of optical fibers.

Once the topographical survey has been established, the device is assembled in a manner such as to match the obstacles encountered (upward slopes, downward slopes, bends, reductions in diameter, other objects, etc.) In particular, it is not necessary to position the device over the entire length of a tubular cavity, but rather, it is necessary merely to equip the linear portions of said cavity with said device. In the non-linear portions, the tubular element remains in position by being held at both ends.

The hoops are open hoops made of a resilient elastic material enabling them to be inserted into the cavity in a contracted form. The hoops are held under stress in the contracted position so that the diameter of the device is smaller than the diameter of the cavity, so as to make them easy to insert. The ends situated on either side of the gap in the circumference of each hoop may overlap or be rolled up.

In order to hold the hoops in the contracted configuration, the device may, for example, be clamped in a removable sheath. It is thus easy to insert into the cavity. Once the device is in place, the sheath is removed, and the hoops take up a deployed configuration. The sheath may be of the sock type, and it is then removed by being turned inside out. It may also be a tearable sheath, e.g. a sheath that can be torn open by means of a wire or thread that is pulled from the outside. The tear force is determined so that, once the tear has started, it propagates over the entire length of the sheath under thrust from the springs, thereby releasing the hoops successively as the tear advances along the installed device. Naturally, the sheath must be made of a non-elastic material such as a film of plastic or a woven fabric. The hoops may be held in position by fixing points that are destroyed, e.g. by pulling on a wire or a thread, once the device is inserted in the cavity.

Once released from this constraint, the hoops act as springs and take up a deployed position, covering an angular zone that is preferably greater than 180°. In the relaxed position, the hoops are of diameter greater than the diameter of the cavity. The hoops are defined so as to be incapable of deploying fully, so that, in this position, they exert strong pressure on the wall of the cavity, thereby holding them firmly in place. Through the combination of their properties of stiffness and of elasticity, the hoops hold the entire device against the top portion of the cavity.

In order to help the hoops to be deployed, an inflatable bag may be disposed at the core of the device. Preferably, the bag is substantially cylindrical in shape. It may be inflated simultaneously with the tearing of the sheath so as to exert pressure on the hoops, and facilitate positioning them in the top portion of the cavity. The pressure exerted by the bag by inflating may also be used to cause the sheath to tear.

In order to position the device at the top of the cavity while the hoops are being deployed, a holding cable may be installed inside the longitudinal support, and held in the high position at the two ends of the cavity. Once the device is in place, the holding cable is removed. It is also possible to dispose a pre-inflated and suitably ballasted bag inside the device. By filling the cavity with water, for example, the device then moves into the high position by itself. Once the device is in place, the water and the inflatable bag are removed from the cavity.

BRIEF DESCRIPTION OF THE DRAWINGS

Other characteristics and advantages of the present invention appear from the following embodiments, naturally given by way of illustrative and non-limiting example, and from the accompanying drawings, in which.

MORE DETAILED DESCRIPTION

Figure 1:
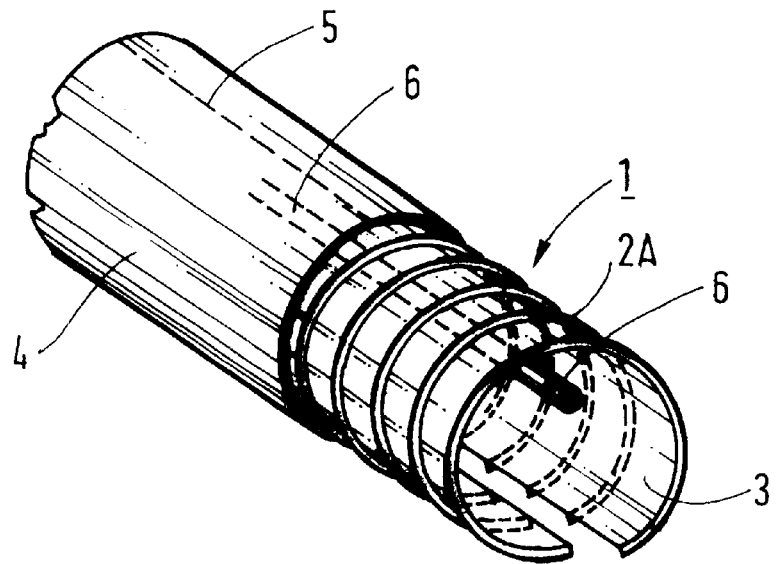
FIG. 1 is a perspective view of an embodiment of the device of the invention before it is inserted into the cavity, the hoops being in a contracted configuration.

FIG. 1 shows a device 1 of the present invention, made up of hoops 2A in a contracted configuration, and interconnected by a membrane 3. The hoops 2A are metal strips made of spring steel and whose thickness is less than their width. For example their thickness lies in the range 1 mm to 5 mm and their width lies in the range 2 mm to 50 mm. The hoops 2A are held in this position by a sheath 4, e.g. made of a plastics material, and shown in part. The sheath 4 has a tear line of weakness 5 along which tearing takes place from a planned break point. In this example, the tubular element 6 is fixed to the hoops and acts as a longitudinal support for the device 1. In this example, the tubular element 6 is a corrugated hollow tube made of steel and designed to contain cables, in particular optical fiber cables.

Figure 2:
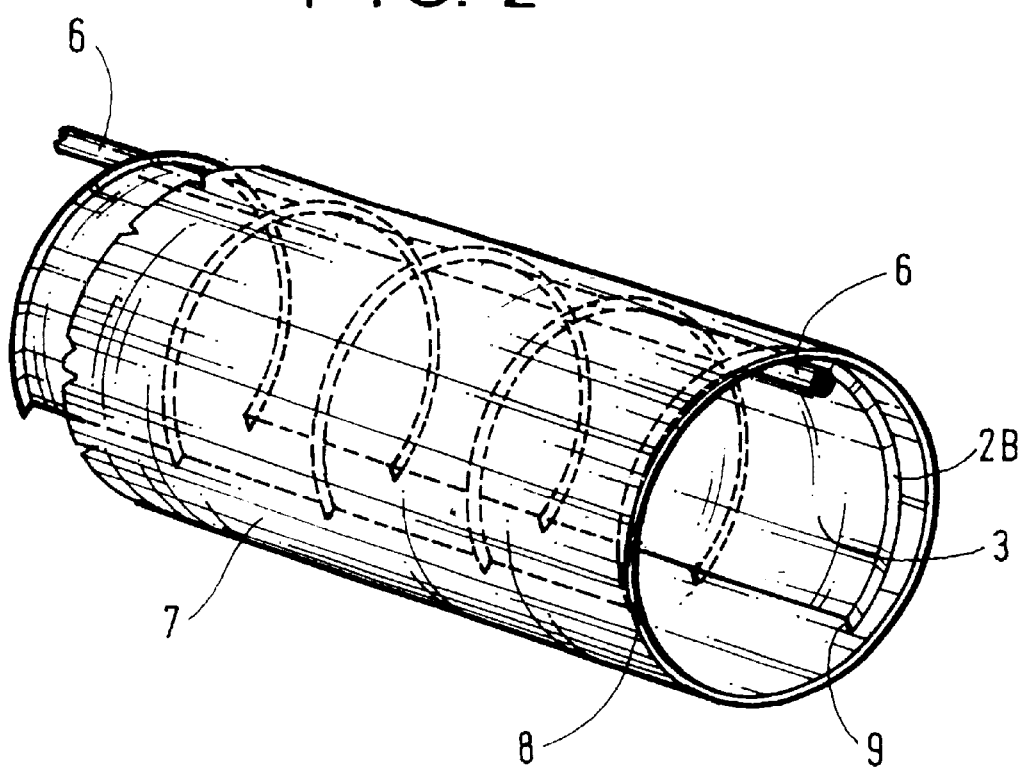
FIG. 2 shows the FIG. 1 device once it has been inserted into the cavity, the hoops being in a deployed configuration.

The device 1 is inserted into a duct 7 as shown in FIG. 2. After breaking and removing the sheath 4, the hoops 2B take up a deployed position. The hoops 2B then abut against the wall of the duct 7. The circular arc over which the hoops 2B extend between their ends 8 and 9 corresponds to an angle α greater than 180° in order to provide secure and fixed abutment. By means of the presence of the membrane 3, the top portion of the duct 7 as lined with the device 1 presents a smooth and clean surface which contributes to making the duct 7 easier to use and to maintain.

Depending on the size and the shape of the duct, and on the length of each of the hoops, the contracted configuration may take a plurality of shapes.

Figure 3:
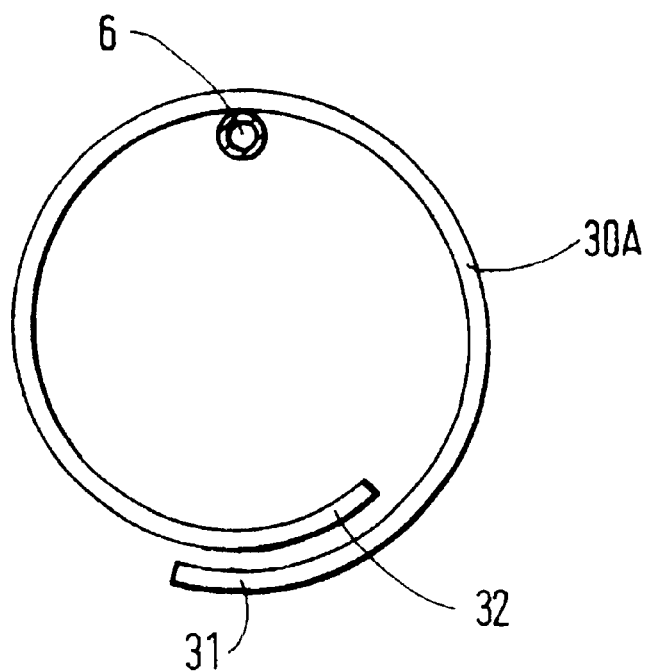
FIG. 3 shows a variant of the contracted configuration of the hoops of the device of the invention.

FIG. 3 shows a hoop 30A that is partially rolled up, with its ends 31 and 32 overlapping. As in the preceding figures, the tubular element 6 is fixed to the hoop 30A.

Figure 4:
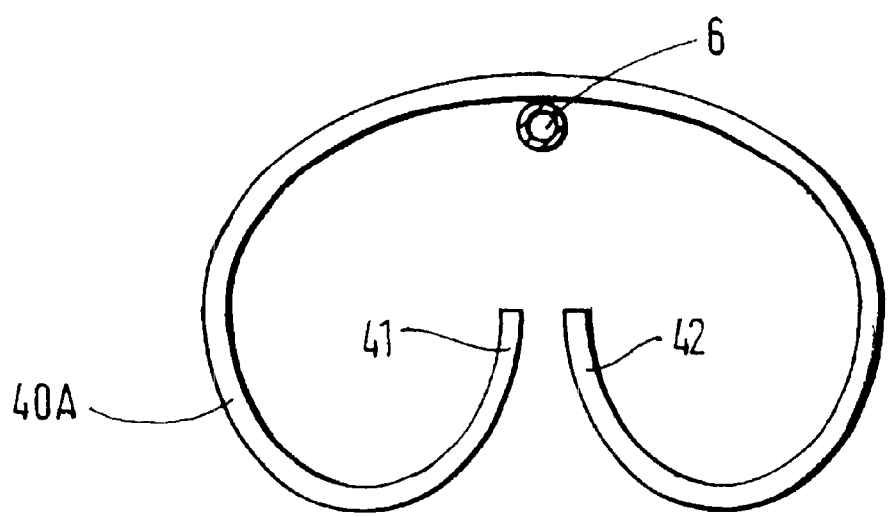
FIG. 4 is analogous to FIG. 3, for another variant of the contracted configuration of the device of the invention.

In FIG. 4, the hoop 40A has each of its ends 41 and 42 rolled up. As in the preceding figures, the tubular element 6 is fixed to the hoop 40A.

When a semi-rigid strength member is incorporated into the device during manufacturing, means must be provided for retaining the tubular element to be installed and for holding it in place.

Figure 5:
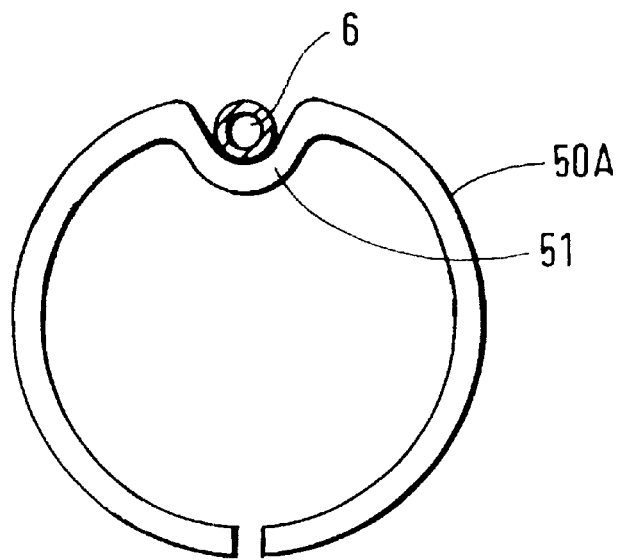
FIG. 5 shows another embodiment of the hoops of the device of the invention.
Figure 6:
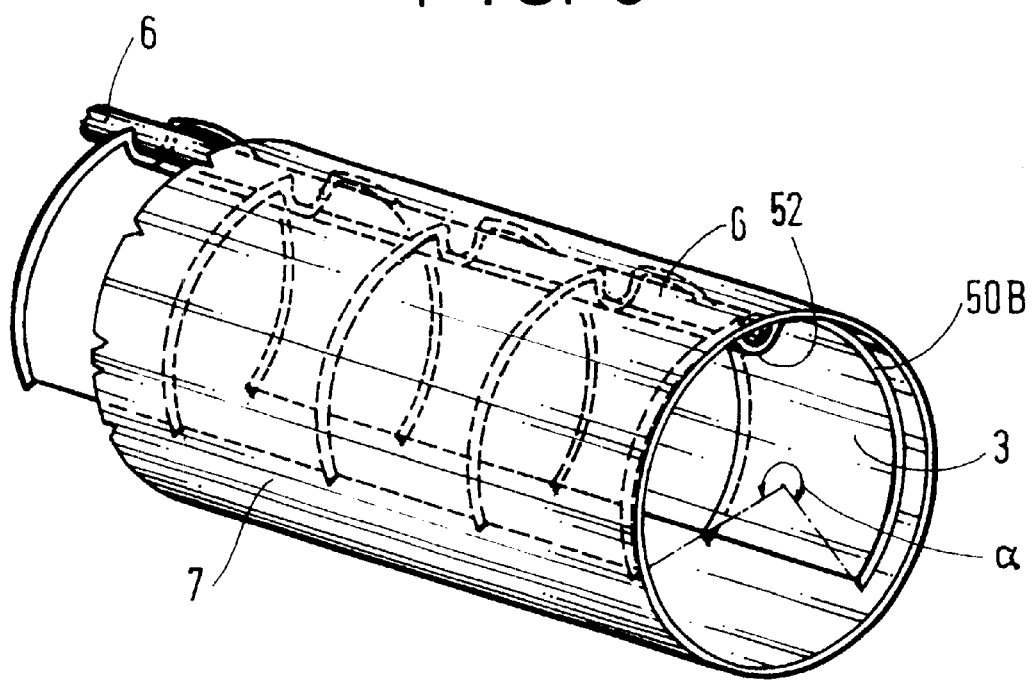
FIG. 6 is a perspective view of a device including the hoops of FIG. 5, after insertion into the cavity.

On the hoop 50A in FIG. 5, such means may be a cradle-forming recess 51 formed by the hoop itself being deformed. A strength member 52 embedded in the membrane 3 guarantees that the hoops 50B are positioned properly as shown in FIG. 6. The tubular element 6 may be inserted subsequently into the recess 51 in which it rests.

Figure 7:
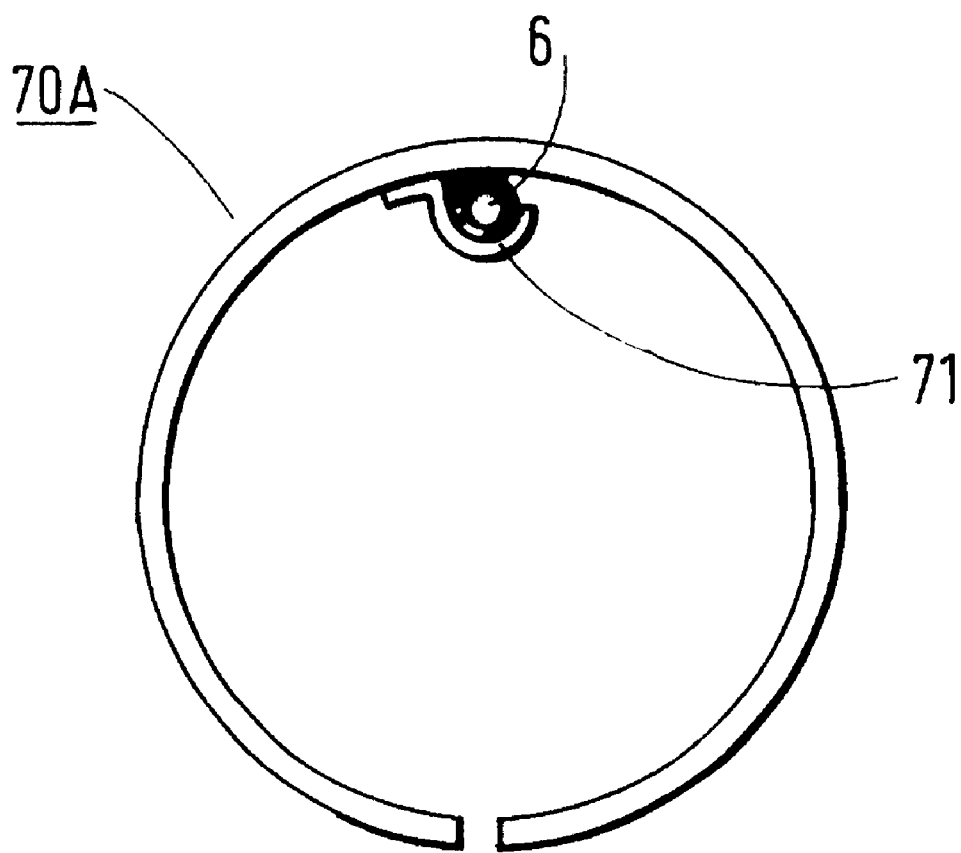
FIG. 7 is analogous to FIG. 5, for yet another embodiment of the hoops.

It is also possible for the retaining means to be separate and fixed to the hoop by welding or adhesive bonding depending on the materials used. A hoop 70A to which a hook 71 is fixed is shown in FIG. 7. The tubular element 6 is inserted after the device of the invention has been put in place in the cavity, and it is retained by the hook 71.

Figure 8:
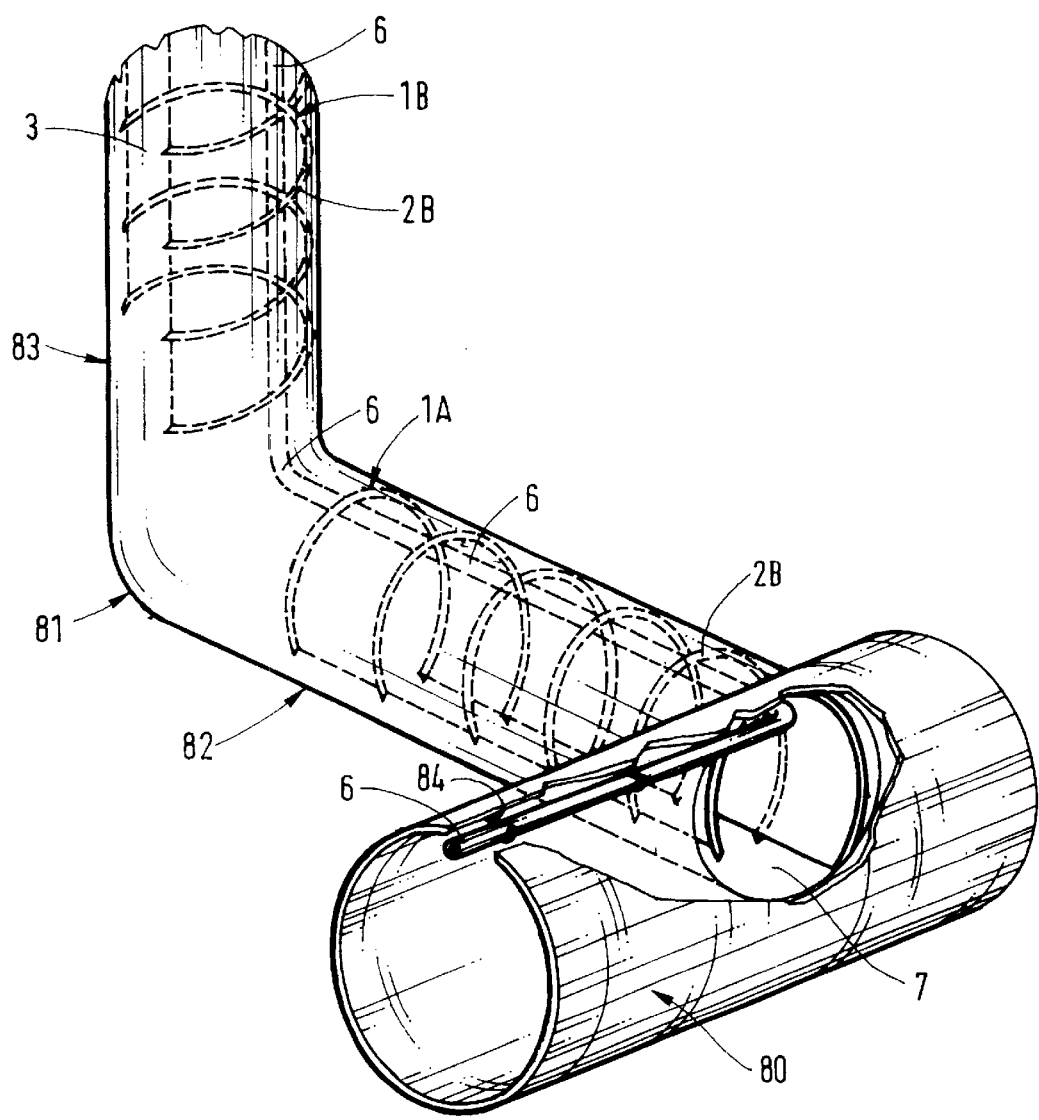
FIG. 8 is a perspective view showing how the device of the invention is installed in a network of tubular cavities.

FIG. 8 shows how the device of the invention is used in a portion of a network of tubular cavities comprising a pipe 80 of diameter making it accessible, and a side duct 7 of smaller diameter and having a bend 81. In this embodiment, the device 1 of the invention is made up of two segments 1A and 1B occupying respective ones of the linear portions 82 and 83 of the duct 7. The number of hoops 2B interconnected by a flexible membrane 3 to make up each of the segments 1A and 1B serving to equip respective ones of the portions 82 and 83 of the duct 7 is determined on the basis of the topographical survey established previously. Between the portions 82 and 83, in the portion forming a bend 81, the tubular element 6 is held at each of its ends fixed to a respective one of the segments 1A and 1B of the device. In the pipe 80, the tubular element 6 is held at the ceiling of the cavity in a commonly-used manner by hooks 84.

Naturally, the present invention is not limited to the embodiments described, but rather numerous variants of it are accessible to the person skilled in the art without departing from the spirit of the invention. In particular, without going beyond the ambit of the invention, it is possible to give the retaining means any known shape suitable for holding the tubular element in the position assigned to it. The device of the invention is described for fixing a single tubular element, but naturally the device may also be used to fix a plurality of tubular elements (optionally of different diameters) whose functions may be similar or different. Such tubular elements may be disposed merely side-by-side, but they may also be superposed insofar as the other functions of the cavity are not disturbed.

What is claimed is:

1. A device for fixing at least one tubular element in a cavity, which device is made up of hoops made of an elastically flexible material disposed in cross-sectional planes of said cavity, and means for retaining said element, said device being characterized in that, along the longitudinal axis of said cavity, said hoops are secured together by a flexible longitudinal support and are interconnected by a flexible membrane.

2. A device according to claim 1, in which said hoops are made of a material selected from a metal, a plastics material, glass fibers, carbon fibers, an elastomer, and a composite material.

3. A device according to claim 1, in which said membrane covers said hoops.

4. A device according to claim 1, in which said membrane is made of elastomer.

5. A device according to claim 1, in which said support is constituted by said tubular element.

6. A device according to claim 1, in which said tubular element is selected from a cable and a hollow tube.

7. A device according to claim 6, in which said tube is corrugated.

8. A device according to claim 6, in which said tube is made of a material selected from metal, a plastics material, glass fibers, carbon fibers, an elastomer, and a composite material.

9. A method of fixing a tubular element by means of the device according to claim 1, the method comprising the following steps:

the topography of the inside wall of said cavity is surveyed by using a remote-controlled instrument;

said device is adapted to match the topography of said cavity;

said device is inserted into said cavity, said hoops being in a contracted form; and the hoops are released and they bear against said wall by taking up a deployed form.

10. A method according to claim 9, in which said hoops are held in the contracted position by a removable sheath.

11. A method according to claim 9, in which each of said hoops is held in the contracted position by a respective fixing point.

12. A method according to claim 9, in which, when said hoops are in the deployed position, they cover an angular zone of greater than 180°.

13. A method according to claim 9, in which an inflatable bag is disposed at the core of the device.

* * * * *